3,030,358
PROCESS FOR REDUCTION OF Δ⁴ ANDROSTENE
[3.2-c] PYRAZOLE COMPOUNDS
Andrew John Manson, North Greenbush, N.Y., assignor to Sterling Drug Inc., New York, N.Y., a corporation of Delaware
No Drawing. Filed May 11, 1961, Ser. No. 109,273
6 Claims. (Cl. 260—239.5)

This invention relates to a reduction process, and in particular is concerned with a method for preparing androstano[3.2-c]pyrazoles by reducing the corresponding 4-androsteno[3.2-c]pyrazoles.

The products of the process of the invention, androstano[3.2-c]pyrazoles, are valuable anabolic agents, and both these compounds and the starting materials for said process are disclosed in the copending application of R. O. Clinton, Serial No. 793,292, filed February 16, 1959.

It has been discovered that 17β-hydroxy-4-androsteno-[3.2-c]pyrazole and 17α-lower-alkyl derivatives thereof can be reduced to 17β-hydroxyandrostano[3.2-c]pyrazole and 17α-lower-alkyl derivatives thereof by treating the former with a liquid ammonia solution of an alkali metal (lithium, sodium, potassium, rubidium or cesium) or alkaline earth metal (calcium, strontium or barium), and with a lower-alkanol. Surprisingly, it was found that the double bond was reduced in excellent yield without affecting the pyrazole ring system or producing appreciable amounts of the 5β isomer (rings A/B cis).

The conversion brought about by the process of the invention is depicted by structural formulas as follows:

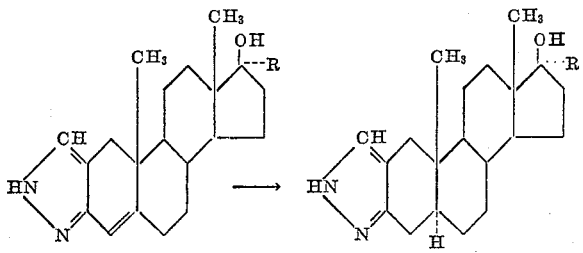

In the above formulas R stands for a hydrogen atom or a lower-alkyl radical having from one to about four carbon atoms including methyl, ethyl, propyl, isopropyl, butyl, isobutyl and the like.

The reaction medium may contain an inert solvent, such as a liquid hydrocarbon solvent or an aliphatic or cycloaliphatic ether, which serves to solubilize the steroid and as a diluent for the liquid ammonia. A preferred inert solvent is tetrahydrofuran.

To insure completion of the reaction, at least four gram atoms of alkali metal (two gram atoms of alkaline earth metal) are required per mole of steroid. It is preferred to use a large excess of the metal.

The lower-alkanol is preferably added after the steroid and metal have been dissolved in the liquid ammonia. Any lower-alkanol can be used and said lower-alkanol has from one to about six carbon atoms, thus including methanol, ethanol, 1-propanol, 2-propanol, 1-butanol, 2-butanol, tertiary-butyl alcohol, amyl alcohol, hexyl alcohol, and the like.

The quantities of liquid ammonia, inert solvent, metal and lower-alkanol relative to the amount of steroid can vary within wide limits. The following examples will illustrate the invention more fully without the latter being limited thereby.

*Example 1*

To a stirred solution of 1.00 g. of 17β-hydroxy-17α-methyl-4-androsteno[3.2-c]pyrazole in 200 ml. of tetrahydrofuran and 400 ml. of liquid ammonia was added 2.12 g. of lithium wire during five minutes. The dark blue mixture was stirred for forty-five minutes. A solution of 40 ml. of tertiary-butyl alcohol in 160 ml. of diethyl ether was added with stirring. After fifteen minutes 25 ml. of ethanol was added with stirring. The mixture turned colorless after several hours, and the liquid ammonia was allowed to evaporate and the mixture warm to room temperature over a period of about fifteen hours. The solvent was evaporated to yield a colorless solid residue, which was taken up in ethyl acetate-ice water. The two layers were separated and the aqueous layer was extracted with ethyl acetate. The combined organic layers were washed with water, saturated sodium chloride solution and filtered through anhydrous sodium sulfate. The solvent was evaporated to yield 1.20 g. of light tan crystals, M.P. 151–155° C., ultraviolet maximum at 224 mμ (E=4,095). Two recrystallizations from ethanol afforded: 1st crop, 0.619 g. (62%) of colorless crystals (dried at 120° C. in vacuo for 17 hours), M.P. 232.8–238.0° C., ultraviolet maximum at 224 mμ (E=4,840), [α]$_D^{25}$ (1% in CHCl$_3$)=+34.8°; 2nd crop, 0.142 g. (14%) of colorless crystals, M.P. 234–242° C. A mixed melting point with authentic 17β-hydroxy-17α-methylandrostano[3.2-c]pyrazole, M.P. 228–241° C., prepared as described in Clinton application Serial No. 793,292, was 230–241° C. The infrared spectrum was identical.

*Example 2*

To a stirred solution of 10.0 g. of 17β-hydroxy-17α-methyl-4-androsteno[3.2-c]pyrazole in 300 ml. of tetrahydrofuran and 300 ml. of liquid ammonia in a 2 l. 3-necked round-bottomed flask equipped with Dry Ice condenser with soda lime drying tube and a mechanical Hershberg stirrer, was added 20 g. of sodium during five minutes. Two layers formed: a bronze-colored upper layer and a gray opaque lower layer. The mixture was stirred for one hour, and then 100 ml. of ethanol was added with stirring through a pressure-equalized dropping funnel during fifteen minutes. The mixture was stirred at reflux for an additional six hours (the two layers were still present at this time) and then the liquid ammonia was allowed to evaporate and the mixture warm to room temperature over a period of about fifteen hours. The gray mixture containing both solid and liquid was concentrated under reduced pressure to about 200 ml. and then poured with stirring into 1500 ml. of ice-water. The mixture was filtered and the collected solid was washed with water and sucked dry to yield light yellow crystals, a portion of which was dried in vacuo at 120° C. for 64 hours to yield light yellow crystals, M.P. 157–165° C., partially resolidified, M.P. <215° C., ultraviolet maxima at 223 mμ (E=4,600), 260 mμ (E=130) (>98% reduction). Two recrystallizations from ethanol afforded 6.38 g. (63%) of colorless crystals of 17β-hydroxy-17α-methylandrostano[3.2-c]pyrazole (dried in vacuo at 120° C. for 20 hours), M.P. 232–241° C., ultraviolet maximum at 223 mμ (E=4,710), [α]$_D^{25}$ (1% in CHCl$_3$)= +34.9°. From the mother liquors the following additional crops were obtained after treatment with activated charcoal and several recrystallizations from ethanol: 1.18 g. of light yellow crystals (dried in vacuo at 120° C. for 17 hours), M.P. 152–155° C., resolidified, M.P. 224–245° C., ultraviolet maxima at 223 mμ (E=4,650), 260 mμ (E=96), [α]$_D^{25}$ (1% in CHCl$_3$)=+34.8°; 0.37 g., M.P. 153–157° C., resolidified, M.P. 222–230° C.; 0.10 g., M.P. 151–154° C., resolidified, M.P. 227–243° C.; 0.47 g., M.P. 207–242° C.

By following the foregoing procedures, 17β-hydroxy-4-androsteno[3.2-c]pyrazole, 17β-hydroxy-17α-ethyl-4-androsteno[3.2-c]pyrazole, 17β-hydroxy-17α-propyl-4-androsteno[3.2-c]pyrazole, 17β-hydroxy - 17α - isopropyl-4-androsteno[3.2-c]pyrazole, or 17β-hydroxy-17α-butyl-4-androsteno[3.2-c]pyrazole can be reduced, respectively, to 17β-hydroxyandrostano[3.2-c]pyrazole, 17β-hydroxy-17α-ethylandrostano[3.2-c]pyrazole, 17β - hydroxy - 17α-propylandrostano[3.2-c]pyrazole, 17β - hydroxy - 17α-isopropylandrostano[3.2-c]pyrazole, or 17β-hydroxy-17α-butylandrostano[3.2-c]pyrazole.

I claim:

1. The process for preparing a compound selected from the group consisting of 17β-hydroxyandrostano[3.2-c]-pyrazole and 17β - hydroxy - 17α - lower-alkylandrostano-[3.2-c]pyrazoles which comprises treating a compound selected from the group consisting of 17β-hydroxy-4-androsteno[3.2-c]pyrazole and 17β-hydroxy-17α-lower-alkyl-4-androsteno[3.2-c]pyrazoles with a liquid ammonia solution of a metal selected from the group consisting of alkali metals and alkaline earth metals and with a lower-alkanol.

2. The process for preparing a 17β-hydroxy-17α-lower-alkylandrostano[3.2-c]pyrazole which comprises treating a 17β-hydroxy-17α-lower-alkyl-4-androsteno[3.2-c]pyrazole with a liquid ammonia solution of an alkali metal and with a lower-alkanol.

3. The process for preparing 17β-hydroxy-17α-methylandrostano[3.2-c]pyrazole which comprises treating 17β-hydroxy-17α-methyl-4-androsteno[3.2-c]pyrazole with a liquid ammonia solution of an alkali metal and with a lower-alkanol.

4. The process for preparing 17β-hydroxy-17α-methylandrostano[3.2-c]pyrazole which comprises treating 17β-hydroxy-17α-methyl-4-androsteno[3.2-c]pyrazole with a liquid ammonia solution of lithium and with a lower-alkanol.

5. The process for preparing 17β-hydroxy-17α-methylandrostano[3.2-c]pyrazole which comprises treating 17β-hydroxy-17α-methyl-4-androsteno[3.2-c]pyrazole with a liquid ammonia solution of sodium and with a lower-alkanol.

6. The process for preparing 17β-hydroxy-17α-methylandrostano[3.2-c]pyrazole which comprises treating 17β-hydroxy-17α-methyl-4-androsteno[3.2-c]pyrazole with a liquid ammonia solution of sodium and with ethanol.

No references cited.